Jan. 24, 1956
E. KLINGE
2,732,415
METHOD AND APPARATUS FOR EXTRACTING
A SOLUBLE COMPONENT FROM MATERIALS
Filed April 12, 1950
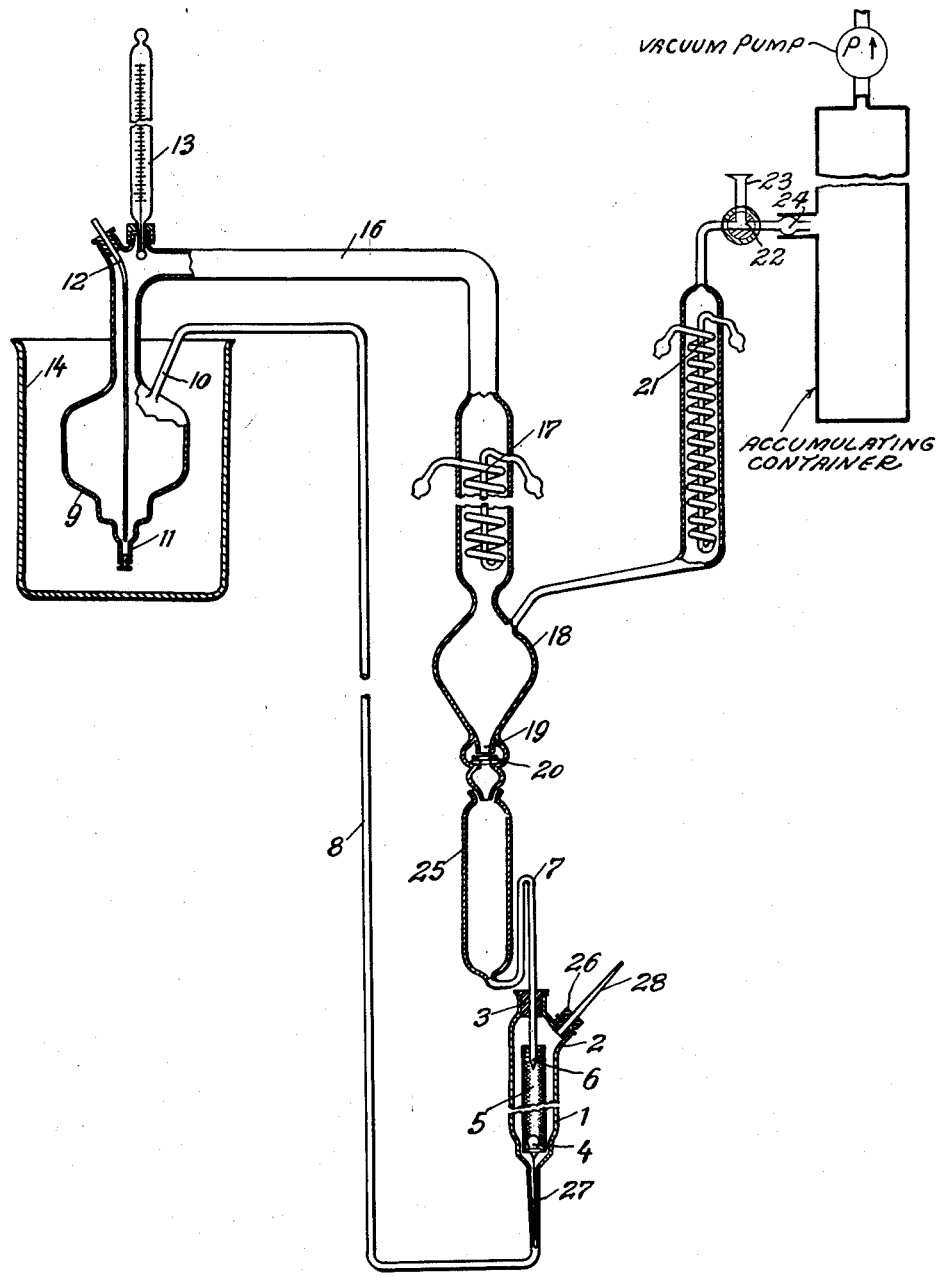
Inventor
Erwin Klinge
by Armand E. Western
Attorney.

United States Patent Office 2,732,415
Patented Jan. 24, 1956

2,732,415

METHOD AND APPARATUS FOR EXTRACTING A SOLUBLE COMPONENT FROM MATERIALS

Erwin Klinge, Munich, Germany

Application April 12, 1950, Serial No. 155,442

9 Claims. (Cl. 260—705)

The present invention relates to a combined extracting and vacuum-evaporizing device which is particularly adapted for extracting organic compounds liable to be injuriously affected by heat and to a method of operating such a device for the purpose of extracting compounds by means of a solvent which is then vaporized in a vacuum.

In customary extracting methods making use of known devices, the extracting solvent while absorbing the matter to be extracted to an increasing degree is either kept at a comparatively high temperature for an extended period of time or is continuously heated and thereby vaporized whereupon the vapors are condensed and returned into contact with the material to be treated. This method is objectionable, particularly when applied to materials liable to be adversely affected by heat, because the extract will suffer from the extended application of heat.

It is an object of the present invention to provide a method of operating the extracting device in such a manner as to avoid or reduce injury to the extract to the utmost degree.

It is another object of the present invention to provide an extracting apparatus capable of such control by reduced pressure that the extracting solvent will be periodically enriched with the compound and will then be treated independently of the extracting operation for the purpose of recovering the extracting liquid or solvent, such treatment taking place under conditions preserving the qualities of the extracted compound, the recovered solvent being intermittently returned to the extracting vessel under control by reduced pressure, a single controlling member being preferably provided to effect such control.

The apparatus according to the present invention comprises substantially an extracting vessel in which the material is subjected to the extracting operation, e. g. at atmospheric pressure and at normal temperature, the solvent being intermittently sucked from such vessel through a pipe communicating with the bottom thereof and leading to a distilling vessel in which the solvent is vaporized under reduced pressure, the concentrated residue or extract being removed from the distilling vessel from time to time. The vapors of the solvent pass from the distilling vessel into a condenser kept under a partial or total vacuum during the evaporation and are condensed therein. The resulting regenerated solvent passes into a storing vessel likewise kept under partial or total vacuum during the evaporation. This storing vessel has a communication with the extracting vessel but such communication is blocked as long as a vacuum or reduced pressure prevails in the storing vessel. Upon removal of such vacuum the communication is opened permitting the regenerated solvent to flow into the extracting vessel.

The solvent may flow from the storing vessel into the extracting vessel either directly by action of gravity upon cessation of the vacuum causing the communication from the storing vessel to the extracting vessel to be unblocked or, in a preferred embodiment of the invention through an intermediate vessel communicating with the extracting vessel by a goose-neck tube establishing a liquid seal, suitable means, such as a check valve, being provided to shut off the storing vessel, when applying vacuum thereto, from the intermediate vessel. The supply of fresh solvent is sucked through the goose-neck from the storing vessel into the extracting vessel through a capillary tube when vacuum is produced in the extracting vessel as a result of the withdrawal of the extracting solvent from the extracting vessel by vacuum. The capillary tube is so dimensioned that the fresh solvent supply will have passed therethrough into the extracting vessel before the vacuum will be shut off following the evaporation of the solvent. A floating valve is provided to prevent the fresh solvent passing from the intermediate vessel into the extracting vessel from being sucked directly from the bottom of the extracting vessel into the evaporizer. The floating valve controlling the suction conduit connecting the extracting vessel with the evaporizer is arranged within the extracting vessel and adapted to be lifted by the fresh solvent supply upon removal of the vacuum and to be closed when the solvent has been sucked out of the extracting vessel.

In a preferred embodiment of the invention the extracting vessel is provided with a coaxially arranged annular sieve or filter. Inside of this filter the floating valve may be provided, whereas the material to be treated may be accommodated within the annular space between the filter and wall of the extracting vessel.

According to another feature of the present invention the floating valve is provided with a valve shaft extending into the suction pipe for guidance therein whereby the valve member will be reliably guided with the respect to its seat.

It is another object of the present invention to provide for a simple intermittent control of the entire extracting apparatus including the evaporizer. This object may be obtained by providing a control valve within a vacuum pipe communicating with the storing vessel which in its turn communicates with the distilling vessel on the one hand and through a check valve with the intermediate vessel on the other hand, the intermediate vessel being adapted to supply the extracting vessel with the solvent through the goose-neck tube constituting a liquid seal.

Another feature of the present invention relates to the design of the bottom of the distilling vessel which may be mounted, for instance, within a tube filled with a heating liquid. For the purpose of safeguarding the extract from injurious effects, the bottom of the distiliing vessel is tapered, preferably in a number of steps, for instance in three steps, the lower most reduced section being provided with an outlet for the concentrated extract, such outlet being normally closed.

Means are provided for intermittently shutting off the vacuum from the apparatus after the extracting vessel has been emptied and after the solvent has been evaporized in the distilling vessel. For this purpose the vacuum conduit is provided with an opening adapted to admit a medium of increased pressure, such as atmospheric air in event the vacuum is a partial one amounting to less than the atmospheric pressure, such opening being preferably controlled by a suitable valve.

The apparatus according to the present invention may be operated at normal pressure being subjected to vacuum intermittently at regular intervals. However, it may be operated with an increased pressure, the pressure being reduced periodically. Under normal conditions in event of heat-sensitive compounds being extracted the apparatus will operate under normal pressure, vacuum being intermittently applied, the pressure of such vacuum depending on the properties of the material to be treated. If such material requires the distilling operation to be carried out at low temperatures, a stronger vacuum will be supplied than otherwise.

According to a feature of the present invention a preferred method for operating the novel extracting apparatus provides for extraction at normal temperature and for an evaporization under vacuum at a low temperature, such as normal temperature in case the solvent boils at normal temperature under the effect of the vacuum supplied. By separating the solvent from the extract in a separate distilling vessel, in the absence of the material to be treated, under conditions excluding any injurious influence and by returning the regenerated extracting solvent intermittently to the material at suitable intervals as often as desired, for instance under control by a motor-operated valve, the extracting operation can be performed at normal temperatures on such materials which, prior to the present invention, required the application of heat for extraction.

In another preferred embodiment of the present invention the extracting vessel has a permanent communication with the atmosphere through a reduced opening whereby a gradual equalization of pressure between the extracting vessel and the atmosphere will take place within the period of reduced pressure prevailing in the apparatus. Preferably, such communication of reduced cross section is established by a capillary tube tapering outwardly which may be inserted in a rubber stopper closing the extracting vessel. Experience has shown that such reduced communication will not only promote the operation of filling the extracting vessel during the vacuum interval but will also facilitate a reliable control and operation of the entire apparatus.

It has been proposed (German patent specification No. 349,080) to connect the extracting vessel with the distilling vessel in which the extracting solvent is regenerated, through a solvent circulation vessel from which fresh solvent is intermittently supplied to the extracting vessel first by setting cocks in pipes, and then, by a certain lifter design. It is mentioned in this prior publication that such cocks in the pipes shall be controlled by floats no definite propositions having been made in this respect. It is essential for this known proposition that the extractor and the distilling vessel are operated under atmospheric pressure, the lifter design being predicated on a continuous feed of the solvent vapors from the distilling vessel into the upper part of the extracting vessel for condensation therein and on the fact that the increase of the content of the extracting vessel by the condensed liquid causes the transfer of the contents of the extracting vessel into the distilling vessel and the transfer of fresh solvent from the circulating vessel into the extracting vessel by the lifter arrangement.

This known proposition is devoid of the essential feature of controlling the extracting apparatus by the intermittent application to the apparatus of vacuum offering a possibility of extracting at normal pressure and of distilling under vacuum thereby preserving the extracted compounds and at the same time affording a possibility of operating the apparatus automatically.

In the drawing a preferred embodiment of the invention is shown diagrammatically.

The extracting vessel 1 encloses a coaxially arranged cylindrical sieve or filter 5. The material to be treated is filled into the annular space between the filter and the walls of the vessel 1. This vessel is provided with a stud 2 closed by a rubber stopper 26 through which a capillary tube 28 extends having an outer pointed end. The top of the extracting vessel is closed by a rubber stopper 3 through which a capillary tube 6 extends. The upper end of this tube constitutes a goose-neck 7 communicating with an intermediate vessel 25.

The conical bottom of vessel 1 forms the seat for a floating valve 4 movable within the lower end of the cylindrical sieve 5 and provided with a shaft 27 slidable within a pipe 8 communicating with vessel 1. This floating valve 4 controls the pipe 8. When vacuum is applied to a distilling vessel 9 communicating with the extracting vessel 1 through pipes 10 and 8, the extracting solvent is sucked out of the vessel 1 through the pipes 8 and 10 into the distilling vessel 9. The latter is mounted within a tub 14 filled with a heated liquid and is provided with a customary capillary tube 12. The residue remaining in the vessel 9 after the solvent has been evaporized may be removed through a lower outlet 11. The vapors of the solvent pass through a neck 15 of the vessel 9 and through a pipe 16 communicating therewith and provided with a thermometer 13 into a condenser 17 in which the vapors are condensed. The regenerated solvent so obtained flows into a storing vessel 18 communicating through a pipe 24 with a suitable source of vacuum, a coil 21 through which a cooling medium circulates being included in the communication between vessel 18 and the pipe 24. A three-way-valve 22 is inserted in the pipe 24 and controls the communication therewith of a pipe 23 opening into the atmosphere. This valve 22 serves to control the apparatus by connecting the same alternately to the source of vacuum or to the atmosphere.

The lower end of the vessel 18 constitutes a seat 19 for a check valve 20 adapted to shut off vessel 18 from the intermediate vessel 25. The latter communicates permanently with the atmosphere thus constituting the only element of the apparatus which cannot be placed under vacuum.

When the valve 22 is turned through 180 degrees with respect to the position shown in the drawing, vacuum will be supplied to the vessels 18 and 9 whereby the check valve 20 will be closed. The reduced pressure which then prevails in the pipes 10 and 8, will be communicated to the extracting vessel 1 and will cause the regenerated solvent collected in the intermediate vessel 25 to be sucked therefrom through the goose-neck pipe 7 and the capillary tube 6 into the vessel 1. This sucking operation will continue for some time even after the floating valve 4 will have shut off the communication between the extracting vessel 1 and the pipe 8. The vacuum prevailing in the extracting vessel 1 will gradually decrease by admission of atmospheric air through the capillary tube 28 whereby the supply of fresh solvent to vessel 1 from the intermediate vessel 25 will cease before the evaporization of the solvent in the vessel 9 will have been finished and before valve 22 will be operated to connect vessel 18 with the outlet 23. The quantity of fresh solvent thus sucked into vessel 1 is preferably so proportioned as to fill two thirds of this vessel.

The evaporizing vessel 9 is tapering at its bottom in three steps. Owing to this fact, the evaporization takes place in cylindrical containers of different diameters depending on the quantity of liquid. The smaller the quantity of the residue will be, the lower will be the level of the liquid. Therefore, the diameter of the wall surrounding the level will be smaller with smaller quantities whereby a complete desiccation will be prevented. This is important because many compounds sensitive to heat are liable to be injuriously affected by a complete desiccation.

The operation of the novel device for extracting material and for evaporating the solvent operates substantially as follows:

The material to be treated is filled into the extracting vessel as described and so much solvent is added as required to raise the level above the filling. The intermediate vessel 25 is likewise filled with solvent halfways. Some extracting solvent is supplied to the distilling vessel 9. The vacuum pump forming part of the source of vacuum communicating with the pipe 24 is started and the valve 22 is so set as to cut off the source of vacuum from the apparatus. The pump communicates with pipe 24 through a large accumulating container which upon evacuation constitutes a powerful source of vacuum capable of evacuating the apparatus abruptly.

Let it be assumed for the purpose of illustration that any extraction step requires ten minutes treatment. After ten minutes have expired, the valve 22 is so set as to connect vessel 18 with the vacuum pipe 24 while closing outlet 23. As a result, the check valve 20 which may be formed by a rubber plate will be closed sealing the bottom of vessel 18.

The vacuum will be communicated from vessel 18 through pipe 16, neck 15, vessel 9, pipe 10 and pipe 8 to the extracting vessel 1. As a result the solvent will be sucked out of vessel 1 lowering the level of the solvent therein until the valve 4 can no longer float and will come to rest on its seat thereby sealing the bottom of vessel 1. In this operation valve 4 will be smoothly guided by its shaft 27 which may be formed of glass.

Owing to the vacuum produced in the vessel 1 when the solvent is sucked out therefrom, fresh solvent is drawn thereinto gradually through the goose-neck pipe 7 and the capillary section 6 thereof. This fresh solvent is supplied so slowly that the valve 4 will have closed before the newly supplied solvent can be sucked out through pipe 8. In this manner the fresh solvent is prevented from being sucked into the evaporizing vessel 9. Hence, after valve 4 has closed, the vessel 1 is gradually filled again with fresh solvent up to the same level as previously.

Immediately upon application of vacuum to the apparatus, the evaporization in vessel 9 commences and the vapors are condensed by the cooling coil 17 to gradually fill up the storing vessel 18 with regenerated solvent. The extracted compound is concentrated in the vessel 9 while the newly supplied solvent acts on the material in vessel 1.

The volume enclosed by the filter 5 is so proportioned with respect to the volume of the material to be treated that both volumes differ as little as possible, the extracting vessel being emptied as far as possible when the extraction is finished.

After an interval of about 10 minutes has elapsed, the valve 22 is so set as to connect the vessel 18 with the outlet 23 closing pipe 24. When this occurs, the check valve 20 will open permitting the regenerated solvent collected in vessel 18 to run down into the intermediate vessel 25. Also, the floating valve 4 will rise within the filter 5 up to the level of solvent. Thereupon the operator will set the valve 22 so as to repeat the evacuation of the apparatus thereby repeating the cycle of operations as described.

In lieu of a manual operation, an automatic operation of the valve 22 may be provided for. To this end any intermittently operating mechanism known per se may be used.

The extracted compounds will gradually collect in the vessel 9. Owing to the repeated extraction by the regenerated solvent, the material to be treated may be extracted to any desired degree up to perfection. The temperature prevailing in the distilling vessel 9 may be controlled as desired, for instance by a gas flame whereby the properties of the extracted compound may be protected from injury. The temperature in the extracting vessel 1 is preferably the normal temperature. In event extracting solvents are to be used which would be sucked out of the apparatus, by a powerful vacuum applied thereto, it is recommended to substitute a refrigerating seal for the cooling coil 21, the condensed solvent being returned to the storing vessel. The refrigeration of the seal must be affected by means of a refrigerating medium fitting the particular circumstances.

In event the various vessels 1, 9, 16, 18 and 25 are made of glass, they may be preferably connected by rubber hose. In case of the provision of mechanically operated means for operating valve 22, the latter must not be rigidly connected with the glass tube containing the cooling coil 21 but should be connected therewith through a piece of rubber hose. In this event the valve cock may be provided with an extended metal handle. Upon expiry of the required period of extraction, the cock must be turned through 90 degrees and a few seconds afterwards must be returned to the old position. The provision of a mechanical motor driven mechanism effecting such valve control does not require any invention but can be designed by anybody skilled in the art and, therefore, need not be described.

While my invention has been explained hereinabove with reference to the specific embodiment thereof shown in the drawings I wish it to be clearly understood that my invention is in no way limited thereto but is capable of numerous modifications within the scope of the claims appended hereto without departing from the spirit of the invention.

What I claim is:

1. Extracting apparatus comprising an extracting vessel, a distilling vessel, means establishing a communication between said vessels adapted to deliver extract from said extracting vessel to said distilling vessel, a floating valve arranged within said extracting vessel to control said communication and adapted to open the same while floating, a storing vessel adapted to contain a solvent, means establishing a communication of the latter with said distilling vessel for admitting solvent from said distilling vessel to said storing vessel, a means for condensing vapors arranged within the last-mentioned communicating means, means for establishing a communication from said storing vessel to said extracting vessel, a restricted inlet for supplying solvent intermittently to said extracting vessel and means for intermittently producing a vacuum in said distilling vessel, whereby at the time of applied vacuum the extract is sucked out of said extracting vessel and delivered to the distilling vessel, the floating valve is closed, the source of vacuum being cut off thereby and the extracting vessel slowly refilled through said restricted inlet.

2. Extracting apparatus comprising an extracting vessel, a distilling vessel in an elevated position with respect to said extracting vessel, means establishing a communication between said two vessels, said means leading from the bottom of said extracting vessel to the upper part of said distilling vessel, a floating valve arranged within said extracting vessel to control said communication and adapted to open the same while floating, a storing vessel adapted to contain a solvent, means establishing a communication of the latter with said distilling vessel for admitting solvent from said distilling vessel to said storing vessel, a means for condensing vapors arranged within the last-mentioned communicating means, means for establishing a communication from said storing vessel to said extracting vessel, a restricted inlet for supplying solvent intermittently to said extracting vessel and means for intermittently producing a vacuum in said distilling vessel, whereby at the time of applied vacuum the extract is sucked out of said extracting vessel and delivered to the distilling vessel, the floating valve is closed, the source of vacuum being cut off thereby and the extracting vessel slowly refilled through said restricted inlet.

3. Extracting apparatus comprising an extracting vessel, a distilling vessel in an elevated position with respect to said extracting vessel, means establishing a communication between said two vessels, said means leading from the bottom of said extracting vessel to the upper part of said distilling vessel, a floating valve arranged within said extracting vessel to control said communication and adapted to open the same while floating, a storing vessel adapted to contain a solvent, means establishing a communication of the latter with said distilling vessel for admitting solvent from said distilling vessel to said storing vessel, a means for condensing vapors arranged within the last-mentioned communicating means, an intermediate vessel communicating with said storing vessel and adapted to receive a supply of solvent therefrom, a check valve arranged between said storing vessel and said intermediate vessel and adapted to close in response to a vacuum prevailing in said storing vessel, means establishing a restricted communication between said intermediate vessel and said extracting vessel to supply same with a charge of solvent, and means for temporarily producing a vacuum in said storing vessel and said distilling vessel, whereby at the time of applied vacuum the extract is sucked out of said extracting vessel and delivered to the distilling vessel, the floating valve is closed, the source of vacuum being cut off thereby and the extracting vessel slowly refilled through said restricted inlet.

4. In an apparatus of the character described, an extracting vessel, an annular sieve coaxially mounted therein, a floating valve movably guided within said sieve, a distilling vessel, a conduit establishing a communication between said vessels adapted to deliver extract from said extracting vessel to said distilling vessel, said valve being adapted to control said communication and to shut off same when the level of solvent in said extracting vessel drops below a predetermined level, a source of vacuum, means connecting said source with said distilling vessel, and a valve inserted in said connecting means for intermittently connecting and disconnecting the source of vacuum from said distilling vessel.

5. Extracting apparatus comprising an extracting vessel, a distilling vessel in an elevated position with respect to said extracting vessel, means establishing a communication between said two vessels, said means leading from the bottom of said extracting vessel to the upper part of said distilling vessel, a floating valve arranged within said extracting vessel to control said communication and adapted to open the same while floating, a storing vessel adapted to contain a solvent, means establishing a communication of the latter with said distilling vessel for admitting solvent from said distilling vessel to said storing vessel, a means for condensing vapors arranged within the last-mentioned communicating means, means for establishing a communication from said storing vessel to said extracting vessel, a gooseneck duct providing a restricted inlet for supplying solvent intermittently to said extracting vessel, a source of vacuum, a conduit establishing a communicating between said storing vessel and said source of vacuum, and a control valve inserted in said conduit, whereby at the time of applied vacuum the extract is sucked out of said extracting vessel and delivered to the distilling vessel and the floating valve is closed, and at the time of disconnection of the vacuum the extracting vessel slowly refilled through said restricted inlet.

6. Extracting apparatus comprising an extracting vessel, a distilling vessel in an elevated position with respect to said extracting vessel, means establishing a communication between said two vessels, said means leading from the bottom of said extracting vessel to the upper part of said distilling vessel, a floating valve arranged within said extracting vessel to control said communication and adapted to open the same while floating, a storing vessel adapted to contain a solvent, means establishing a communication of the latter with said distilling vessel for admitting solvent from said distilling vessel to said storing vessel, a means for condensing vapors arranged within the last-mentioned communicating means, means for establishing a communication from said storing vessel to said extracting vessel, a gooseneck duct providing a restricted inlet for supplying solvent intermittently to said extracting vessel, a source of vacuum, a conduit establishing a communication between said storing vessel and said source of vacuum, cooling means associated with said conduit and a control valve inserted in said conduit, whereby at the time of applied vacuum the extract is sucked out of said extracting vessel and delivered to the distilling vessel and the floating valve is closed, and at the time of disconnection of the vacuum the extracting vessel slowly refilled through said restricted inlet.

7. Extracting apparatus comprising an extracting vessel adapted to be charged with material containing a soluble component and with a solvent, an annular sieve coaxially mounted therein, a floating valve movably guided within said sieve, a distilling vessel in an elevated position with respect to said extracting vessel, a conduit establishing a communication between said vessels adapted to deliver extract from said extracting vessel to said distilling vessel, said conduit leading off the bottom of said extracting vessel, said valve being adapted to control said communication and to shut off same when the level of solvent in said extracting vessel drops below a predetermined level, a source of vacuum, means connecting said source with said distilling vessel, means constituting a restricted communication between said extracting vessel and the atmosphere, a valve inserted in the means connecting said source of vacuum with said distilling vessel, a vessel adapted to contain a supply of solvent, and means establishing a restricted communication of said last mentioned vessel with said extracting vessel and adapted to refill said extracting vessel when the latter has been sucked empty.

8. Extracting apparatus comprising an extracting vessel adapted to be charged with material containing a soluble component and with a solvent, an annular sieve coaxially mounted therein, a floating valve movably guided within said sieve, a distilling vessel at an elevated position with respect to said extracting vessel, a conduit leading from the bottom of said extracting vessel and establishing a communication between said vessels adapted to deliver extract from said extracting vessel to said distilling vessel, said valve being adapted to control said communication and to shut off same when the level of solvent in said extracting vessel drops below a predetermined level, a source of vacuum, means connecting said source with said distilling vessel, a stopper closing said extracting vessel, a capillary tube passing through said stopper and constituting a restricted communication between said distilling vessel and the atmosphere, a valve adapted to control said source of vacuum, a vessel adapted to contain a supply of solvent, and means establishing a restricted communication of said last-mentioned vessel with said extracting vessel and adapted to refill said extracting vessel when the latter has been sucked empty.

9. A method of extracting heat-sensitive material, which comprises the steps of carrying out the extraction by a solvent with exclusion of heating and under atmospheric pressure, intermittently removing the extracted material with the solvent, separating the extracted material from said solvent by heating the latter to moderately increased temperature below one injuriously affecting the extractive and by intermittently sucking the solvent off under reduced pressure, condensing the vapors thereof, and returning the liquid solvent to the extracting step.

References Cited in the file of this patent

UNITED STATES PATENTS

| Number | Name | Date |
|---|---|---|
| 491,028 | Thomas | Jan. 31, 1893 |
| 829,763 | Burt et al. | Aug. 28, 1906 |
| 1,636,550 | Buel | July 19, 1927 |
| 1,880,634 | Wolf | Oct. 4, 1932 |
| 1,942,848 | Taylor et al. | Jan. 9, 1934 |
| 2,413,107 | Kuhn | Dec. 24, 1946 |
| 2,451,081 | Ford | Oct. 18, 1948 |
| 2,515,730 | Ornfelt | July 18, 1950 |

FOREIGN PATENTS

| Number | Country | Date |
|---|---|---|
| 349,080 | Germany | Feb. 23, 1922 |